DEVICE FOR STABILIZING THE FREQUENCY
OF AN ULTRA-SHORT WAVE TRANSMITTER
Filed Aug. 27, 1946

INVENTOR
PIERRE GUENARD
By John B. Brady
Attorney

Patented Apr. 3, 1951 2,547,159

UNITED STATES PATENT OFFICE 2,547,159

DEVICE FOR STABILIZING THE FREQUENCY OF AN ULTRA SHORT WAVE TRANSMITTER

Pierre Guenard, Paris, France, assignor to Compagnie Generale de Telegraphie Sans Fil, a corporation of France Application August 27, 1946, Serial No. 693,289
In France April 19, 1945

Section 1, Public Law 690, August 8, 1946
Patent expires April 19, 1965

6 Claims. (Cl. 250—17)

This invention relates to a device for stabilizing the frequency of an ultra-short wave transmitter. It is more especially concerned with a method permitting of stabilizing the frequency of a transmitter of decimetric waves with a transit time generator of any type. It is essentially characterized by the guide of waves fed by the oscillator being coupled to two rectifiers, for instance two diodes, one through the intermediary of a cavity of a high Q factor, the other directly. The variations of the high tension applied to the oscillator are controlled by the variations of the current of the first diode about a point situated on the side of the resonance curve of the cavity, this point being so chosen that the variations of voltage induce variations of frequency in a direction reverse to those that have caused them. The point of the resonance curve is fixed, on the other hand, independently of the power delivered, by means of the second diode, the current of which opposes that of the first diode.

My invention will be more fully understood from the following specification by reference to the accompanying drawings, in which:

Figure 1 diagrammatically illustrates the system of my invention;

Figures 1, 2, 3, 4, 5, 6, 7:
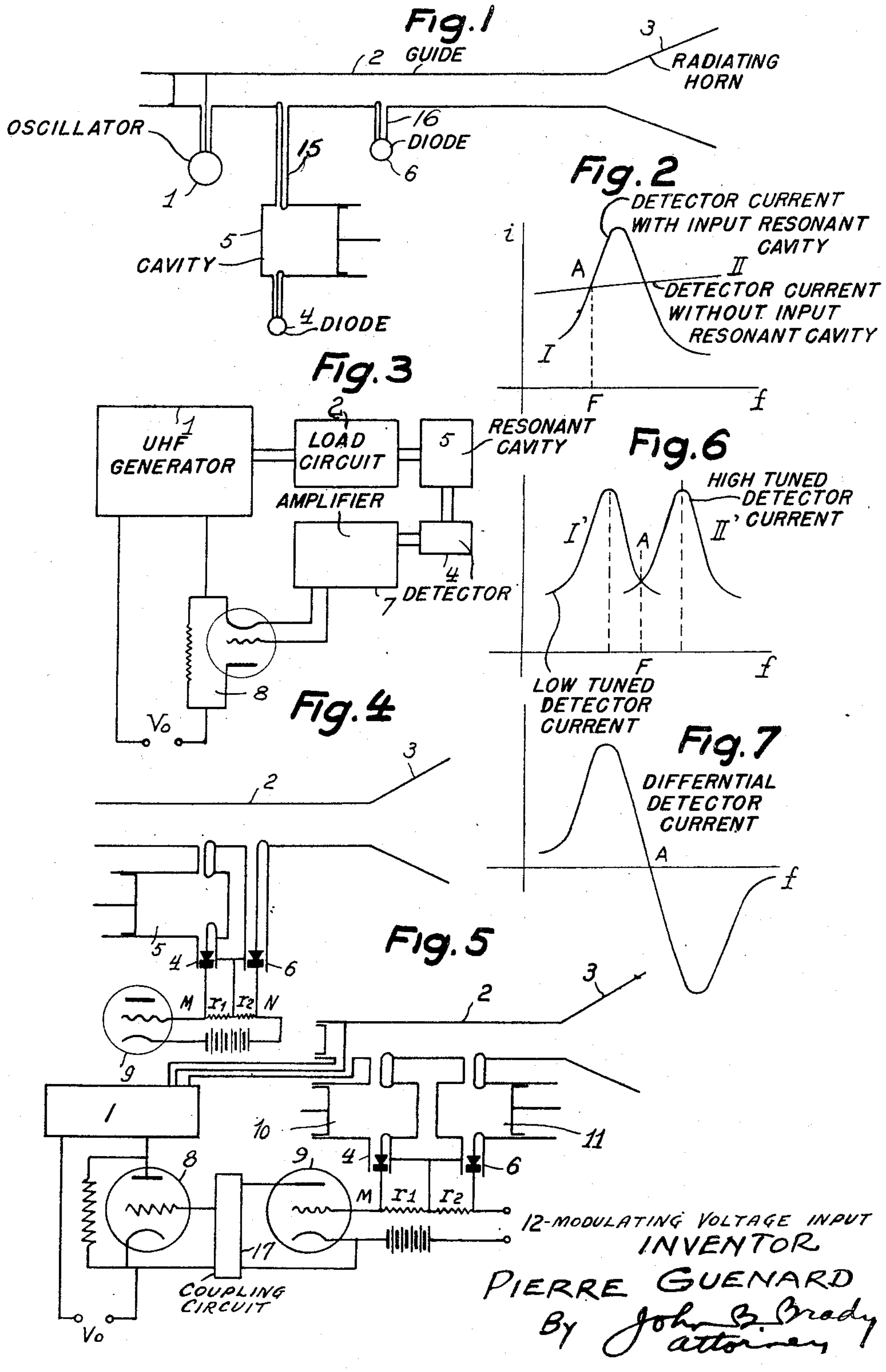
Fig. 2 is a curve diagram comparing the operation of the detector with the input resonant cavity and without the input resonant cavity.
Fig. 3 shows the system of my invention with means for compensating the variations of frequency of the oscillator.

Fig. 4 diagrammatically shows one method of controlling the rectified currents in the system of my invention;

Fig. 5 shows the application of the rectifiers in the system of my invention to two resonators;

Fig. 6 is a curve diagram explaining the operation of the circuit of Fig. 5; and Fig. 7 is a curve diagram showing the characteristic of the differential detector current in the circuit of Fig. 5.

The following explanations will permit of understanding, through an example of embodiment which is by no means limitary, the manner of putting in practice the principle of the invention.

Fig. 1 shows a diagram as a whole of the device according to the invention. The oscillator 1 feeds to the guide 2 ended by the radiating horn 3; one first diode 4 is coupled to the guide 2 through the intermediary of the cavity 5 of a high Q factor through the branch guide section 15; a second diode 6 is coupled to the guide 2 by a non-tuned circuit, or a circuit having a very low Q factor through the branch guide section 16.

The current of the diode 4 varies with the frequency of the oscillator 1 in response to the resonance curve I of Fig. 2 where intensities are plotted as ordinates against the frequencies as abscissae. According to the purpose aimed at by the invention, it is intended to control the variations of the high tension applied to the oscillator by the variations of the current of the diode 4 about a point A suitably chosen on the side of the curve I. The position of the point A on I is fixed independently of the power delivered by means of the diode 6, the current of which opposes to that of the diode 4, as it is stated more precisely hereinafter.

Fig. 3 shows a diagram of the principle of the device which permits of compensating the variations of frequency of the oscillator whatever be the origin of these variations, by acting upon the voltage applied to the pilot tube of the transmitter. To this end, a small part of the high frequency energy is taken off the load 2 of the transmitter 1 and sent on to the resonator 5 tuned to a frequency adjacent to the frequency transmitted, and to which the rectifying diode 4 is coupled. The rectified current varies as a function of the frequency according to the curve I of Fig. 2. On the other hand, the resonator 5 being tuned in such manner that the frequency of operation F corresponds to a point A on the side of the curve I, small variations of frequency about that point are shown by relatively important variations of the rectified current. This rectified current, after being amplified in 7, is used for insuring the correspondence through the intermediary of a known device 8, between the variations of the current and the variations of the voltage Vo applied to the pilot tube of the transmitter in such an appropriate direction that they compensate the very variations of frequency which have caused them.

But, in all the foregoing exposition, it was implicitly supposed that the variations of the rectified current proceed but from the only variations of the frequency of the transmitter, that is to say that the transmitted power remains constant. The device of Fig. 4, conformable to the invention, permits of evading this last condition. For this purpose, in the grid circuit of the input valve 9 of the amplifier 7 there are opposed the voltages which are respectively produced by the circulation through the resistances $r_1$ and $r_2$ of the rectified currents furnished by the receivers 4 and 6, one being coupled to the resonator 5, the other to the load 2 through the intermediary of a non-tuned circuit, it being understood that the variations as a function of the frequency of the currents of the two rectifiers have respectively the forms of the curves I and II of the Fig. 2, the intersection A of which corresponds to the frequency F of operation of the transmitter and to a null voltage across the points M and N (Fig. 4). The variations of the voltage Vo applied to the pilot tube of the transmitter are thus controlled by the variations of the rectified current about the point A of fixed abscissa (Fig. 2).

Fig. 5 schematically shows the invention employing two resonators. The generator and feed means therefore are of the type shown in Fig. 3 and have been indicated by the correspondingly numbered UHF generator 1 and the device 8 associated with valve 9 of amplifier 7 through suitable coupling circuit 17.

More generally, it is possible to couple the rectifiers 4 and 6 (Fig. 5) respectively to the two resonators 10 and 11, de-tuned on either side of the frequency F to be transmitted, that is to say, having respectively the resonance curves I' and II' arranged as indicated in Fig. 6.

Under these conditions, the voltage applied to the grid of the input valve 9 (Fig. 5) of the amplifier 7 varies as a function of the frequency as indicated in Fig. 7.

In addition, the device according to the invention is adaptable without further alteration to frequency modulation. To that end, it only needs to vary, by means of the signal of a low frequency to be transmitted, the voltage applied to the grid of the input valve 9 of the amplifier 7. The modification of Fig. 5, for which the curve voltage-frequency (Fig. 7) *a* shows a long rectilinear part about the point A, is particularly recommended for this application; the low frequency signal is applied at 12 (Fig. 5).

While I have described my invention in certain of its preferred embodiments I realize that modifications may be made and I desire that it be understood that no limitations upon my invention are intended other than may be imposed by the scope of the appended claims.

What I claim is:

1. An ultra-short wave emitter system including a generator of ultra-high frequency, means for feeding said generator, a dielectric guide excited by said generator, at least one branch guide section on this guide including a detector, means for picking up at the output end of this detector a current responsive to the frequency variations of the generator due to the deviations of the feed means from a predetermined condition, and means for injecting the said current in the said feed means so as to reduce the said deviations of the said feed means from the said predetermined conditions.

2. An ultra-short wave emitter system including a generator of ultra-high frequency, means for feeding said generator, a dielectric guide excited by said generator, two branch guide sections on this guide each including a detector, means for opposing the output currents of these detectors so as to obtain a differential current responsive to the frequency variations of the generator due to the deviations of the feed means from a predetermined condition, and means for injecting the said differential current in the said feed means so as to reduce the said deviations of the said feed means from the predetermined conditions.

3. An ultra-short wave emitter system including a generator of ultra-high frequency, means for feeding said generator, a dielectric guide excited by said generator, two branch guide sections on this guide each including a detector, one of these branch guide sections including in addition a circuit resonant in ultra-high frequency and tuned on a slightly different frequency from the frequency produced by the generator for a predetermined condition of the said feed means, means for opposing the output currents of these detectors so as to obtain a differential current responsive to the frequency variations of the generator due to the deviation in the said feed means and circuits in relation to the said predetermined condition, and means for injecting the said differential current in the said feed means so as to restore them to the said predetermined condition.

4. An ultra-short wave emitter system including a generator of ultra-high frequency, means for feeding said generator, a dielectric guide excited by said generator, two branch guide sections on this guide each including a detector fed through a circuit resonant to ultra-high frequency, the said circuit being tuned in one of these branch guide sections above and in the other branch guide section below the frequency produced by the generator for a predetermined condition of the feed means, means for opposing the output currents of said detectors so as to obtain a differential current responsive to the frequency variations of the generator due to the deviations in the said feed means and circuits in relation to the said predetermined condition, and means for injecting the said differential current in the said feed means so as to restore them to the said predetermined condition.

5. An ultra-short wave emitter system including a generator of ultra-high frequency, means for feeding said generator, a dielectric guide excited by said generator, two branch guide sections on this guide each including a detector fed through a circuit resonant in ultra-high frequency, the said circuit being tuned in one of these branch guide sections above and in the other branch guide section below the frequency produced by the generator, a circuit for picking up a differential voltage resulting from the output currents of the said detectors, means for injecting in the said circuit a modulating voltage, and means for injecting the combined voltage sum of said modulating voltage and of the said differential voltage of the said circuit in the said feed means for the purpose of modulating the emitter.

6. An ultra-short wave emitter system including a generator of ultra-high frequency, means for feeding said generator, a dielectric guide excited by said generator, two branch guide sections on this guide each including a detector, a thermionic tube including in its input circuit two resistances in series associated respectively with the output circuits of the said detectors so as to pick up differentially the currents thereof, the grid of said tube, being thereby excited by voltage proportional to the resultant differential current of the detectors, which is representative of the frequency applied at the input circuit of the said detectors, said tube having, in its output circuit, a resistance inserted in the said feed means, the feed voltage being thereby varied, when the generator frequency varies and means for adjusting the feed voltage variation to compensate for said frequency variations.

PIERRE GUENARD.

REFERENCES CITED

The following references are of record in the file of this patent:

UNITED STATES PATENTS

| Number | Name | Date |
|---|---|---|
| 1,626,724 | Demarest et al. | May 3, 1927 |
| 2,262,932 | Guanella | Nov. 18, 1941 |
| 2,425,981 | Bard et al. | Aug. 19, 1947 |
| 2,426,193 | Fernsler | Aug. 26, 1947 |